April 12, 1966 C. L. SPORCK 3,245,243
ROLLER MOUNTING MEANS
Filed June 29, 1965 2 Sheets-Sheet 1

INVENTOR
Claus L. Sporck
BY
Synnestvedt & Lechner
ATTORNEY

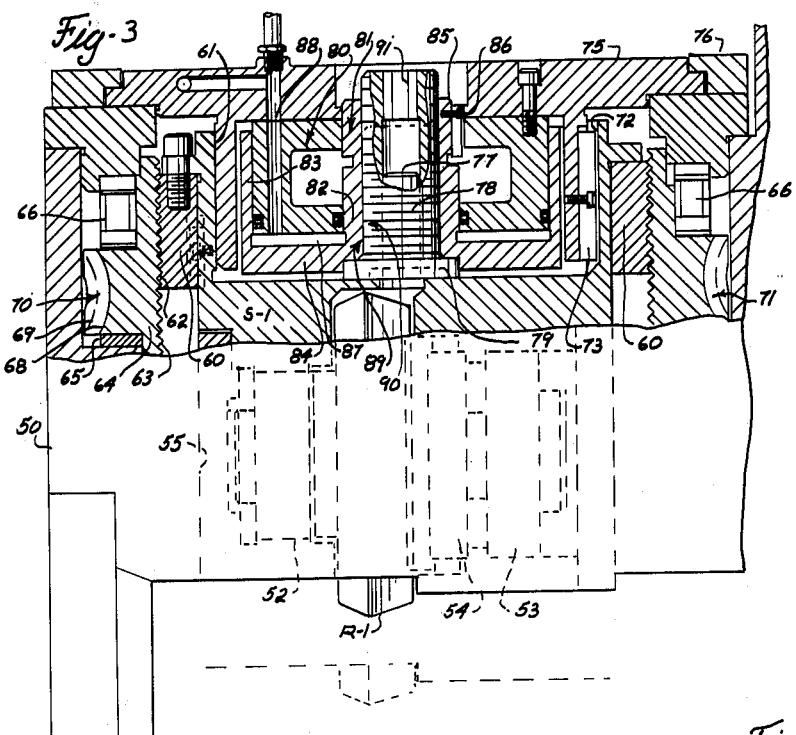
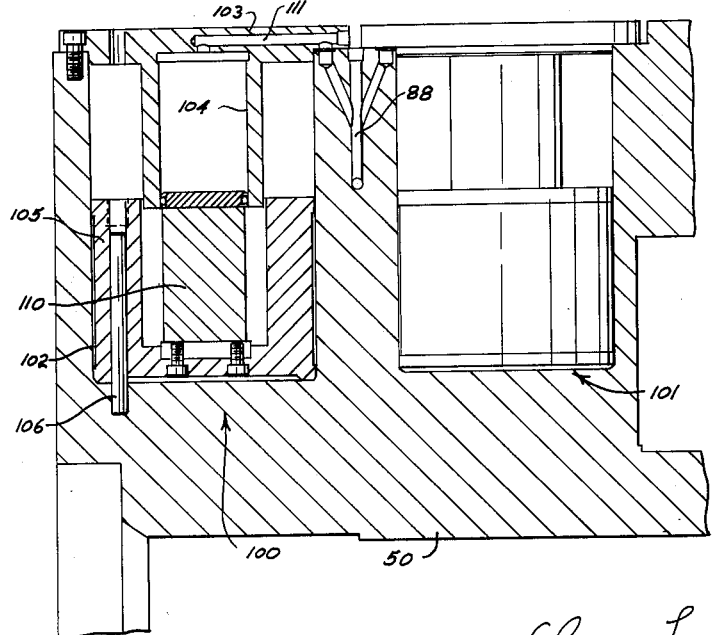

United States Patent Office 3,245,243
Patented Apr. 12, 1966

3,245,243
ROLLER MOUNTING MEANS
Claus L. Sporck, 6498 E. Shore Drive,
Traverse City, Mich.
Filed June 29, 1965, Ser. No. 472,389
8 Claims. (Cl. 72—78)

This application is a continuation-in-part of my copending application Serial No. 313,647, filed Oct. 3, 1963, now abandoned.

This invention relates to mechanism to permit a member which is developing considerable centrifugal force due to rotation to be easily and precisely adjusted toward and away from the axis of rotation.

One of the principal uses of the invention is in conjunction with power spinning equipment having a rotary frame carrying a plurality of rollers each of which must be finely and accurately adjusted toward and away from the rotational axis during a working operation.

For accurate roller adjustment the invention contemplates mounting the roller on a support which is moved toward and away from the rotational axis by a precision nut and screw device. The centrifugal forces developed by the roller and its support if imposed on the nut and screw threads would make such adjustments virtually impossible. To overcome the effects of centrifugal force, I have provided a means which will develop a force proportional to the centrifugal force of the roller and its support and impose this force on the support in a manner to counteract or balance the centrifugal force. By this balancing force any load which would otherwise be imposed on the screw threads is relieved.

A typical embodiment of the invention will be described below in connection with the following drawings wherein:

FIGURE 3 is an elevational view partially in section of another embodiment of the invention; and FIGURE 4 is a fragmentary sectional view of piston devices for use with the embodiment of FIGURE 3.

Figure 2:
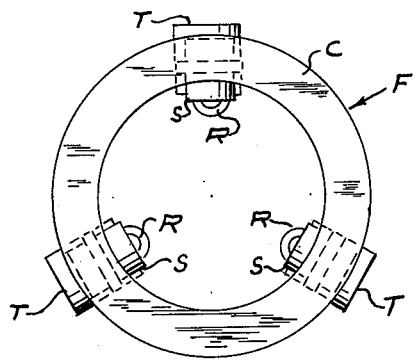
FIGURE 2 is a diagrammatic view of a power spinning frame carrying a plurality of rollers.

In FIGURE 2 the frame F is adapted to rotate about the axis A. The frame includes the carrier C mounting the roller rests T. The rests can be moved toward and away from the axis A to accommodate blanks or tubes of different diameters. Each rest carries a support S mounting a roller R.

The mechanism for rotatably mounting the frame and for moving the roller rests is conventional and need not be described for present purposes.

Each support S and its roller R is mounted so that it can be moved toward and away from the axis A while the frame F is rotating. Mechanism for making such adjustment and for providing a counterbalancing force is illustrated in FIGURE 1.

Figure 1:
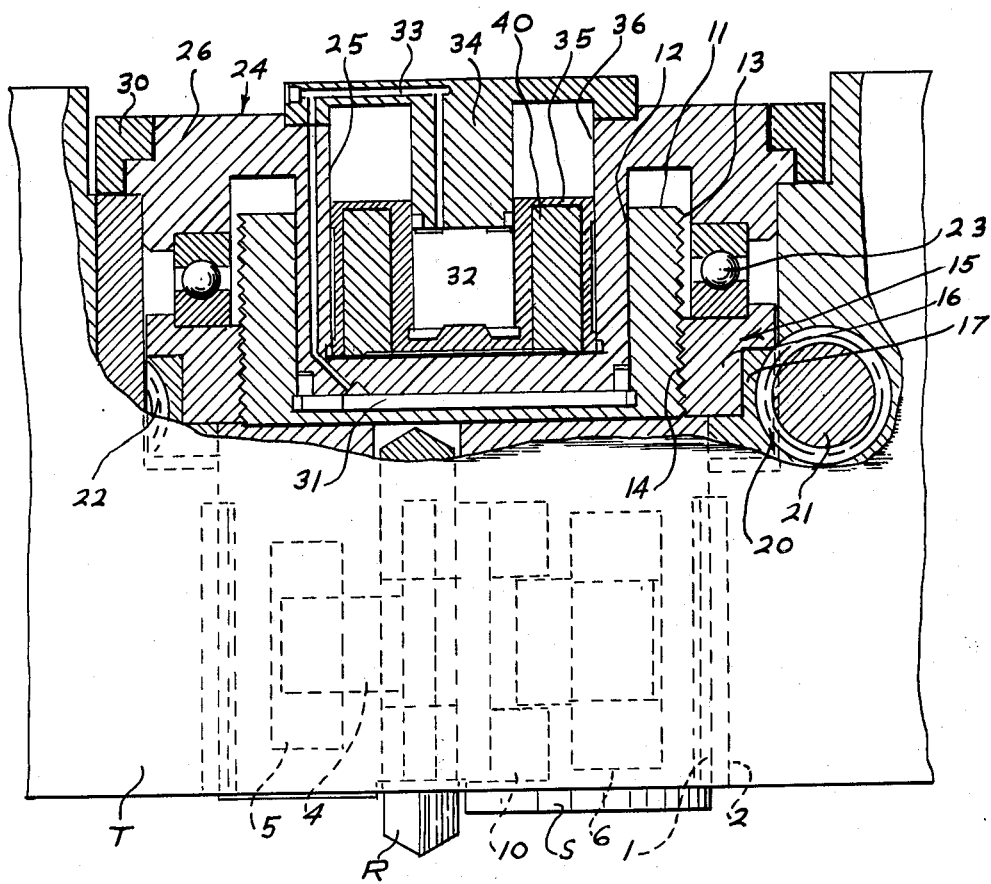
FIGURE 1 is an elevational view partially in section of the invention as applied to a roller of a power spinning machine.

In FIGURE 1 the rest T has a bore 1 within which is slidably disposed the support S. The keys 2 operating in appropriate keyways in the rest and in the support 1 provide for movement of the support along the bore but prevent the support S from rotating. The roller R is mounted on a shaft 4 supported at each end by radial thrust bearings 5 and 6 and centrally by the axial thrust bearings 10. The details of the construction of the shaft and bearings will be readily apparent to those skilled in the art and no further comment is necessary.

The support S carries a cylindrical extension 11, the inside of which is formed with a cavity 12 and the outside of which is formed with screw threads 13. The screw threads 13 mate with threads 14 carried by the nut 15.

The nut 15 is comprised of two rings 16 and 17, the ring 16 carrying the threads 14 and the ring 17 having threads 20 constituting a worm wheel which mates with the threads on worms 21 and 22.

As indicated the worms 21 and 22 are suitably mounted in the rest T. Preferably the worms are driven by a motor-gear arrangement (not shown). The nut 15 makes a sliding fit with the rest and bearings 23 provide for a rotary support. By rotating the worms 21 and 22 the nut 14 is made to rotate. This causes the support to move back and forth relative to the frame.

From the above description, it will be apparent that with rotary motion of the frame, the centrifugal force developed by the support S and the roller R could be transmitted by the threads 13 and 14 to the rest and thence to the frame. With such load transmission, the threads would be very tightly engaged and this would make precise adjustment of the support impractical, if not impossible.

The mechanism which is described below provides that the screw threads are essentially load free and hence, the nut can be easily turned even though the frame is rotating at a high rate of speed and the support and roller are developing rather substantial centrifugal force.

A load bearing member 24 has a central hub 25 which extends into the cavity 12 and has a radially extending skirt 26 which abuts the rest T and is held securely on the rest by the clamp ring 30. The bottom part of the central section 25, together with the bottom part of cavity 12 form a fluid pressure chamber 31.

It will be observed that fluid pressure in chamber 31 develops a force which reacts between the support S and the load bearing member 24. This force can be developed to an extent that it counteracts or balances the centrifugal force of the support S.

For controlling or regulating the pressure in the chamber 31, I have provided a column of fluid 32 which is connected to the chamber by the fluid connection 33. By means of forces exerted on this column the pressure in the chamber 31 is raised or lowered. The force exerted on the fluid column 32 is developed by a piston and cylinder arrangement which comprises the piston 34 fixed to the load bearing member and a cylinder 35 movably mounted within a bore 36 formed in the load bearing member.

The cylinder 35 is weighted as by the lead 40. As the frame and support are rotating, the cylinder 35 develops centrifugal force and tends to move outwardly and hence imposes a load on the column 32. This load, of course, is proportional to the amount of centrifugal force developed by the cylinder. By appropriately selecting the weight of the cylinder and the size of the ends of the fluid chamber 31, the force due to the pressure in the chamber 31 is proportional to or developed as a function of the centrifugal force of the support and roller S. In other words, the force exerted by the fluid pressure in chamber 31 increases or decreases in the same manner as the centrifugal force of the support and roller increases and decreases.

In the above-described embodiment, the primary purpose of the roller adjustment by movement of the support is to provide a capability for controlling or varying the wall thickness of the blank or tube being worked. Tube diameter change is taken care of by the adjustment of the roller rest as a whole. Adjustment for wall variation is usually relatively small so that a wide range of roller motion is unnecessary. The principal limitation on the range of adjustment is the relationship between the volume of oil in the fluid pressure chamber 31 and the oil volume in chamber 32. At maximum roller adjustment radially inwardly, the volume of oil in the chamber 32 must be sufficient to appropriately regulate the pressure in chamber 31.

In certain instances, it is desirable not only to move the support to position the roller for varying wall thickness, but also to move the support to position the roller to accommodate tubes of widely differing diameters and in both of such instances to provide for proper operation of the counterbalancing force mechanism. A preferred embodiment for accomplishing the foregoing is shown in FIGURES 3 and 4.

In FIGURE 3, the roller and its support are mounted on a rotary frame such as the frame 50. The frame 50 is similar to the rotary frame F in FIGURE 2. Preferably three rollers are spaced 120° apart around the frame. The three rollers and their supporting means are identical and therefore the descriptions will encompass only the structure shown in FIGURE 3.

The roller R-1 is mounted on the shaft 51 which is supported on opposite ends by radial thrust bearings 52 and 53. Between the roller R-1 and the thrust bearings 53 are the axial thrust bearings 54. The details of structure of the shaft, roller and thrust bearings will be readily apparent to those skilled in the art and need not be further described.

The roller support mechanism S-1 extends into a bore 55 in the frame 50 and carries the thrust bearings 52, 53 and 54. The support S-1 is mounted in the bore 55 for reciprocating motion generally radially of the rotational axis of the frame. This radial motion of the support is of course imparted to the roller. The mechanism for adjustably reciprocating the support and roller is described first below.

The support S-1 has a generally cylindrical extension 60 which is formed with a bore or cavity 61. The peripheral edge of the extension 60 carries the threads 62. The threads 62 mate with threads 63 formed on a ring-like nut 64. The nut is rotatably mounted in the frame as by the bearings 65 and 66. The nut has outer threads 68 constituting a worm wheel mating with threads 69 on the worms 70 and 71. The worms are rotatably mounted in the frame 50.

The support S-1 is held against rotational motion by means of a plurality of key and keyway arrangements disposed around the cavity 61. Only one such arrangement is indicated. The extension 60 is provided with an internal way 72 which accepts the key 73 fixed on the extension 74 of the load-bearing cover member 75. The cover member 75 is fixed on the frame 50 by the clamp ring 76.

By rotating the worms, the nut 64 is made to rotate and this causes the support S-1 to move back and forth. Thus the roller R-1 is moved toward and away from the rotational axis of the frame. The worms are rotated by conventional means such as a motor-gear arrangement (not shown).

The position of the roller R-1 for working tubes of maximum diameter is indicated by the full lines in FIGURE 3 and the position of the roller R-1 for working tubes of minimum diameter is indicated by the dotted lines in FIGURE 3.

By appropriately rotating the nuts 70 and 71, the support S-1 can be moved so that the roller R-1 will assume the maximum or minimum position or some position intermediate thereto. It will be observed that the foregoing represents substantial movement of the roller. Regardless of this extended movement the mechanism to develop a counterbalancing force to relieve effects of centrifugal force on the threads 62 and 63 remains operative. The preferred structure for accomplishing this is described below.

Centrally of the cavity 61 is a stud 77 which is fixed to the support S-1. Over the stud is a sleeve 78 which has a foot 79. The sleeve 78 is rotatably and slidably mounted on the stud, the stud acting as a motion guide for the sleeve.

The load bearing member 75 has an apertured central boss 80 on which is slidably mounted the cylinder member 81. The apertured inner extension of the cylinder member is identified at 82 and the outer extension at 83. The inner and outer extensions are connected by a cross piece 84. While the cylinder member is slidable on the boss it is prevented from rotating by several keys. One of the keys 85 is shown attached to the inner extension 82 and this key operates in a way 86 formed in the load bearing member 75 and in the boss 80.

The inner part of the boss 80 and the cylinder member 81 form a chamber 87 which is supplied with fluid under pressure via the line 88. The cylinder member 81 and the sleeve 78 are tied together by means of the threads 89 and 90 respectively on the periphery of the sleeve 78 and on the aperture of the extension 82. These threads transfer load between the member 81 and the sleeve 78 and provide for sleeve to be movable relative to the member.

The force developed by the fluid in the chamber 87 is transferred to the sleeve through the threads 89 and 90 and thence through the foot 79 to the support member S-1.

Means are provided for developing the fluid pressure in the chamber 87 as a function of the centrifugal force developed by the roller, the roller support and the connected parts. The cylinder member 81 and sleeve 78 cause this force to be exerted directly on the support S-1 to counteract the centrifugal force. Thus the load on the threads 62 and 63 is relieved so that the nut 64 can be freely turned even when the frame is rotating at high speeds.

If the support S-1 is moved inwardly to position the roller for working a tube of small diameter, the sleeve 78 can also be moved inwardly until the foot 79 abuts the support. This is done by rotating the sleeve through a wrench inserted in the socket 91. Thus for any radial position of the roller to work tubes of maximum, minimum or normal intermediate diameter, the sleeve 78 can be moved to maintain its contact with the support. This insures application of the counterbalancing force on the support.

Note that with the sleeve adjusted as described, the cylinder member 81 remains fixed in position so that the chamber 87 is not enlarged. This, of course, is due to the interengagement of the threads 89 and 90. This feature of the device is very important because the size of the chamber 87 is held to a minimum even though the roller is radially inward to a relatively larger extent.

The above-mentioned contact between the sleeve 78 and the support S-1 is maintained when the roller is moved for controlling wall thickness. This is brought about by the fact that when the support is moved inwardly, fluid pressure in the chamber 87 will cause the cylinder member 81 and the sleeve 78 to follow the support. The amount of inward motion of the support and hence inward motion of the cylinder member is relatively small with a consequence that the expansion of chamber 87 is small. In this regard, the expansion of the chamber 87 is like that of chamber 31 in FIGURE 1.

The feature of adjusting the sleeve 78 relative to the cylinder 81 for various of the roller positions is important. Without this feature the chamber 87 would have to expand a considerable amount as between maximum and minimum tube diameter conditions. This would greatly increase the volume of fluid necessary to take care of chamber expansion and to insure the development of counteracting forces. With the described arrangement, the necessary structural parts are greatly simplified in form and reduced in size.

To insure sufficient fluid volume for the expansion of chamber 87 during wall thickness variation operations and to insure the development of sufficient force to counterbalance the weight of the rollers and support, I have provided a pair of fluid pressure units including pistons which operate on fluid columns commonly connected to the feed line 88. In the present embodiment, the units are separated from the support means and roller. They are preferably located in the space between adjacent rollers.

A typical arrangement is shown in FIGURE 4 where it will be seen that the frame 50 mounts a pair of fluid pressure units 100 and 101. The unit 101 is identical to the unit 100 so only the unit 100 will be described.

The frame has a cavity 102 provided with a cap 103 which has a centrally located cylinder 104. Disposed within the cavity 102 is a slider 105 mounted on guide pins 106 and carrying a piston member 110. The motion of the slider 105 is transverse and generally radial the frame rotational axis. The piston member extends into the cylinder 104. The cylinder 104, line 88 and chamber 87 are filled with fluid. The slider has weight means (not shown).

During rotation of the frame, the centrifugal force developed by the weight in the slider tends to move the same radially outwardly tending to push the piston 110 into the cylinder 104. This causes a reaction on the fluid column in the cylinder 104 and this is transferred to the fluid pressure chamber 87. By appropriately selecting the weight of the slider 105 the area of the chamber 104 and the area of the chamber 87, the force developed will be a function of the centrifugal force of the support S–1, the roller R–1, and connected parts, and the support will have an appropriate counteracting force imposed thereon so that the load on the threads 62 and 63 is relieved.

I claim:

1. In combination:
   a rotary frame;
   support means;
   mechanism mounting said support means on said rotary frame for rotary motion therewith and for movement relative to the frame toward and away from the frame rotational axis, and the support means, when rotating with said rotary frame, developing centrifugal force;
   a threaded adjusting nut rotatably mounted on said rotary frame and screw threads formed on said support means cooperating with said nut threads, rotation of the nut causing said movement of the support means and said threads being disposed so as to be capable of transmitting said centrifugal force to the rotary frame;
   a load bearing member connected to said rotary frame;
   mechanism operative when said rotary frame is rotating to develop a working force as a function of the centrifugal force developed by said support means; and
   means to cause said working force to react between said support means and said load bearing member to substantially counteract said centrifugal force and relieve load imposed on said threads by the centrifugal force so that the nut can be turned to adjust the support means while the support means is rotating.

2. In combination:
   a rotary frame;
   support means;
   mechanism mounting said support means on said rotary frame for rotary motion therewith and for movement relative to the frame toward and away from the frame rotational axis, and the support means, when rotating with said rotary frame, developing centrifugal force;
   a threaded adjusting nut rotatably mounted on said rotary frame and screw threads formed on said support means cooperating with said nut threads, rotation of the nut causing said movement of the support means and said threads being disposed so as to be capable of transmitting said centrifugal force to the rotary frame; and
   means connected between said rotary frame and said support means and operative when the frame is rotating to develop a working force as a function of said centrifugal force and impose the working force on said support member to counteract its centrifugal force and relieve load imposed on said threads by the centrifugal force so that the nut can be turned to adjust the support means while the support means is rotating.

3. In combination:
   a rotary frame;
   support means;
   mechanism mounting said support means on said rotary frame for rotary motion therewith and for movement relative to the frame toward and away from the frame rotational axis, and the support means, when rotating with said rotary frame, developing centrifugal force;
   a threaded adjusting nut rotatably mounted on said rotary frame and screw threads formed on said support means cooperating with said nut threads, rotation of the nut causing said movement of the support means and said threads being disposed so as to be capable of transmitting said centrifugal force to the rotary frame; and
   means including a fluid pressure chamber formed between said rotary frame and said support means and mechanism operative when the frame is rotating to regulate the pressure in said chamber as a function of said centrifugal force, the pressure in the chamber imposing a force on said support means to counteract the centrifugal force and relieve load imposed on said threads by the centrifugal force so that the nut can be turned to adjust the support means while the support means is rotating.

4. In combination:
   a rotary frame provided with a bore the axis of which extends transverse to the frame axis of rotation;
   support means;
   mechanism mounting said support means in said bore for rotary motion with the rotary frame and for movement along the axis of the bore and said support means, when rotating with said rotary frame, developing centrifugal force;
   a threaded adjusting nut rotatably mounted on said rotary frame and screw threads formed on said support means cooperating with said nut threads, rotation of the nut causing said movement of the support means and the threads being disposed so as to be capable of transmitting said centrifugal force to the rotary frame;
   mechanism on said support means forming a cavity;
   a load bearing member connected to said rotary frame and extending into said cavity, the load bearing member and the cavity forming a fluid pressure chamber;
   a cylinder;
   means on said load bearing member mounting the cylinder for movement in the same direction as the direction of movement of said support means, and the cylinder, when the frame is rotating, developing centrifugal force;
   a piston fixed to said load bearing member and extending into said cylinder;
   a fluid connection between said cylinder and said cavity; and
   fluid disposed in said chamber, in said connection and in said cylinder, the centrifugal force of the cylinder being operative when said frame is rotating to cause the cylinder to react on the fluid therein and develop fluid pressure in the chamber, the fluid pressure in the chamber reacting between said support means and said load bearing member to substantially counteract the centrifugal force of said support means and relieve load imposed on said threads by the centrifugal force so that the nut can be turned to adjust the support means while the support means is rotating.

5. In combination:
a rotary frame;
support means;
mechanism mounting said support means on said rotary frame for rotary motion therewith and for movement relative to the frame toward and away from the frame rotational axis, and the support means, when rotating with said rotary frame, developing centrifugal force;
a threaded adjusting nut rotatably mounted on said rotary frame and screw threads formed on said support means cooperating with said nut threads, rotation of the nut causing said movement of the support means and said threads being disposed so as to be capable of transmitting said centrifugal force to the rotary frame;
a fluid pressure chamber formed between said rotary frame and said support means; and
mechanism developing fluid pressure when the frame is rotating and connected to said chamber to regulate the pressure in said chamber as a function of said centrifugal force, the pressure in the chamber imposing a force on said support member to counteract the centrifugal force and relieve load imposed on said threads by the centrifugal force so that the nut can be turned to adjust the support means while the support means is rotating.

6. In combination:
a rotary frame;
support means;
mechanism mounting said support means on said rotary frame for rotary motion therewith and for movement relative to the frame toward and away from the frame rotational axis, and the support means, when rotating with said rotary frame, developing centrifugal force;
a threaded adjusting nut rotatably mounted on said rotary frame and screw threads formed on said support means cooperating with said nut threads, rotation of the nut causing said movement of the support means and said threads being disposed so as to be capable of transmitting said centrifugal force to the rotary frame;
a fluid pressure chamber formed between said rotary frame and said support means;
piston and cylinder elements mounted on said frame for rotation therewith and one of the elements being movable relative to the other in a direction transverse said rotational axis and said one element developing centrifugal force when the frame is rotating; and
a fluid connection between said cylinder element and said chamber, and fluid in the cylinder, in the chamber and in the connection, the centrifugal force of said one element being operative to react on the fluid in the cylinder and develop fluid pressure in the chamber as a function of said centrifugal force of the support means, the pressure in the chamber imposing a force on said support means to counteract the support centrifugal force and relieve load imposed on said threads by the support centrifugal force so that the nut can be turned to adjust the support means while the support means is rotating.

7. A construction in accordance with claim 6 wherein said piston and cylinder elements are separated from said support means.

8. In combination:
a rotary frame provided with a bore the axis of which extends transverse to the frame axis of rotation;
support means;
mechanism mounting said support means in said bore for rotary motion with the rotary frame and for movement along the axis of the bore and said support means, when rotating with said rotary frame, developing centrifugal force;
a threaded adjusting nut rotatably mounted on said rotary frame and screw threads formed on said support means cooperating with said nut threads, rotation of the nut causing said movement of the support means and the threads being disposed so as to be capable of transmitting said centrifugal force to the rotary frame;
mechanism on said support means forming a cavity;
a load bearing member connected to said rotary frame and having an apertured boss extending into said cavity;
a stud disposed centrally of said cavity and fixed on said support means and extending into said boss aperture;
a cylinder member slidably mounted on said central boss and being formed with a threaded aperture, the aperture being coaxial with said stud;
means to permit the sliding of said cylinder member on said boss but to prevent rotary motion thereof;
a sleeve rotatably, slidably mounted on said stud, the outer periphery of said sleeve having threads engaging with said cylinder threads, rotation of the sleeve causing the same to slide along the stud for engaging said support;
a fluid pressure chamber formed by said central boss and said cylinder member, the fluid pressure in the chamber urging said cylinder member and said sleeve in a direction for the sleeve to engage said support means; and
mechanism on said frame and operative when the frame is rotating to regulate the pressure in said chamber as a function of said centrifugal force, the pressure in the chamber causing said sleeve to impose a force on said support member to counteract the centrifugal force and relieve load imposed on said nut threads by the centrifugal force so that the nut can be turned to adjust the support means while the support means is rotating.

References Cited by the Examiner
UNITED STATES PATENTS

| 700,360 | 5/1902 | McTear | 72—78 |
| 999,757 | 8/1911 | Diescher | 72—78 |
| 3,029,845 | 4/1962 | Egedal | 140—147 |

CHARLES W. LANHAM, *Primary Examiner.*

R. J. HERBST, *Assistant Examiner.*